United States Patent
Ota

(10) Patent No.: US 7,376,355 B2
(45) Date of Patent: May 20, 2008

(54) OPTICAL TRANSMISSION APPARATUS AND OPTICAL TRANSMISSION SYSTEM

(75) Inventor: Kenji Ota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 545 days.

(21) Appl. No.: 10/923,854

(22) Filed: Aug. 24, 2004

(65) Prior Publication Data

US 2005/0213980 A1   Sep. 29, 2005

(30) Foreign Application Priority Data

Mar. 23, 2004   (JP) .............................. 2004-085199

(51) Int. Cl.
   *H04B 10/24*   (2006.01)
(52) U.S. Cl. ........................... 398/167; 398/38; 398/83
(58) Field of Classification Search ............ 398/37–38, 398/83–84, 97, 167
   See application file for complete search history.

(56) References Cited

U.S. PATENT DOCUMENTS

| | | | |
|---|---|---|---|
| 6,204,945 B1 | 3/2001 | Iwata et al. .................. | 359/124 |
| 6,233,076 B1 | 5/2001 | Iwata et al. .................. | 359/133 |
| 7,123,405 B2 * | 10/2006 | Yokoyama et al. ...... | 359/341.2 |
| 2002/0054406 A1 * | 5/2002 | Duerksen .................... | 359/127 |
| 2002/0105695 A1 | 8/2002 | DeGrange, Jr. et al. .... | 359/127 |
| 2002/0131696 A1 | 9/2002 | Yokoyama et al. ........... | 385/27 |

FOREIGN PATENT DOCUMENTS

| | | |
|---|---|---|
| JP | HEI 10-28106 | 1/1998 |
| JP | HEI 10-150433 | 6/1998 |

OTHER PUBLICATIONS

French Patent Office Preliminary Search Report dated Feb. 21, 2006, in counterpart French Patent Application No. 0410000000.

* cited by examiner

*Primary Examiner*—Leslie Pascal
(74) *Attorney, Agent, or Firm*—Staas & Halsey LLP

(57) ABSTRACT

An optical transmission apparatus includes a return line for connecting a first transmission line and a second transmission line opposed to the first transmission line in order to make it possible to commonly use a transmitter-receiver or a repeater, for example, between a trunk line and a branch line and prevent a situation that the power of branched signal lights increases excessively. The optical transmission apparatus is configured so that dummy lights inputted together with signal lights to be added to signal lights transmitted through the first transmission line are sent to the second transmission line through the return line and are outputted together with signal lights to be dropped from the second transmission line.

7 Claims, 8 Drawing Sheets

OPTICAL TRANSMISSION APPARATUS AND OPTICAL TRANSMISSION SYSTEM

CROSS REFERENCE TO RELATED APPLICATIONS

This application is based on and hereby claims priority to Japanese Application No. 2004-85199 filed on Mar. 23, 2004 in Japan, the contents of which are hereby incorporated by reference.

BACKGROUND OF THE INVENTION

1) Field of the Invention

The present invention relates to an optical transmission apparatus (optical add/drop apparatus) and an optical transmission system suitable for use with a WDM (Wavelength Division Multiplexing) optical transmission system such as, for example, a high-capacity long-distance submarine optical transmission system.

2) Description of the Related Art

Among WDM optical transmission systems which are being developed at present, for example, those systems (DWDM) which perform a wavelength division multiplexing process for 60 to 150 signal lights of different waves are being popularized in order to implement a high-capacity system.

For example, as shown in FIG. 6, a high-capacity long-distance optical submarine transmission system (optical submarine cable system) 100 as a DWDM optical transmission system includes a transmitting station (terminal) 101 for transmitting wavelength division multiplexed signal lights, and an optical transmission line (trunk line) 102 for interconnecting the transmitting station 101 and a receiving station 103. The receiving station (terminal) 103 receives the wavelength multiplexed signal lights transmitted thereto through the optical transmission line 102. The high-capacity long-distance optical submarine transmission system 100 further includes an optical add/drop apparatus (branching unit) 104 for branching a signal light having a specific wavelength from among the wavelength division multiplexed signal lights from the transmitting station 101 and multiplexing a signal light transmitted through an optical transmission line (branch line) 106 connected to a branch station 105. The branch station (terminal) 105 receives the signal light of the specific wavelength branched by the optical add/drop apparatus 104 and transmits a signal light to be multiplexed with the signal lights transmitted in the optical transmission line 103 (for example, refer to Japanese Patent Laid-Open No. 10-28106). It is to be noted that a plurality of optical amplifiers 107 are provided on the optical transmission lines 102 and 106.

In such an optical transmission system as just described, some signal lights b from among all signal lights a (refer to reference character A) transmitted from the transmitting station 101 are branched (dropped) by the optical add/drop apparatus 104 and transmitted to the branch station 105 through the optical transmission line 106 (refer to reference character B). On the other hand, the remaining signal lights c (refer to reference character C) are multiplexed with (added to) signal lights d (refer to reference character D) transmitted from the branch station 105 by the optical add/drop apparatus 104, and the multiplexed signal lights e (refer to reference character E) are transmitted to the receiving station 103 through the optical transmission line 102.

It is to be noted that, while only the trunk line (up line or down line) for one direction is shown in FIG. 6 in order to facilitate understanding, actually, not only the one-direction trunk line but also a trunk line (down line or up line) for the opposite direction are provided so that bidirectional communication can be performed. Further, while the transmitting station 101, receiving station 103 and branch station 105 here are described as terminals, even if they are formed as repeater stations, they operate similarly. In this instance, the transmitting station 101 functions as a repeater station on the transmitting side and the receiving station 103 functions as a repeater station on the receiving side, and the branch station 105 functions as a repeater station on the branch side.

In the optical add/drop apparatus (add drop branching unit) used in the optical transmission system configured in such a manner as described above, for example, as shown in FIG. 5, an optical circulator 111, an optical fiber grating 112, an optical isolator 113, another optical fiber grating 114, and another optical circulator 115 are interposed in order in an up line (trunk line) 110. Further, an optical circulator 121, an optical fiber grating 122, an optical isolator 123, another optical fiber grating 124, and another optical circulator 125 are interposed in order in a down line (trunk line) 120 opposed to the up line 110. Further, a dropping branch line 116 is connected to the optical circulator 111, and an adding branch line 117 is connected to the optical circulator 115. Meanwhile, a dropping branch line 126 is connected to the optical circulator 121, and an adding branch line 127 is connected to the optical circulator 125 (refer to, for example, Japanese Patent Laid-Open No. 10-150433).

Thus, wavelength division multiplexed signal lights transmitted from the transmitting station through the up line 110 pass the optical circulator 111 and enter the optical fiber grating 112. In the optical fiber grating 112, only those signal lights individually having specific wavelengths (for example, approximately 20 signal lights) from among the wavelength division multiplexed signal lights (for example, 100 wavelength division multiplexed signal lights) transmitted from the transmitting station are reflected. Then, the reflected specific wavelength signal lights are sent to the branch line 116 through the optical circulator 111, and are transmitted to the branch station through the branch line 116. Consequently, the signal lights individually of the specific wavelengths (for example, approximately 20 signal lights) from among the wavelength division multiplexed signal lights (for example, 100 wavelength division multiplexed signal lights) transmitted from the transmitting station are dropped.

On the other hand, the signal lights having passed through the optical fiber grating 112 without being reflected enter the optical fiber grating 114 through the optical isolator 113. Meanwhile, signal lights transmitted from the branch station through the branch line 117 enter the optical fiber grating 114 through the optical circulator 115 and are reflected by the optical fiber grating 114. Then, in the optical fiber grating 114, the signal lights transmitted from the branch station through the branch line 117 are multiplexed with (added to) the signal lights transmitted from the transmitting station through the up line 110. The multiplexed signal lights pass the optical circulator 115 and are transmitted to the receiving station through the up line 110.

Similarly, wavelength division multiplexed signal lights transmitted from the transmitting station through the down line 120 pass the optical circulator 121 and enter the optical fiber grating 122. By the optical fiber grating 122, only those signal lights individually having specific wavelengths (for example, approximately 20 signal lights) from among the wavelength division multiplexed signal lights (for example, 100 wavelength division multiplexed signal lights) transmitted from the transmitting station are reflected. Then, the reflected specific wavelength signal lights are sent to the branch line 126 through the optical circulator 121 and are transmitted to the branch station through the branch line 126. Consequently, the signal lights individually having specific wavelengths (for example, approximately 20 signal lights) from among the wavelength division multiplexed signal lights (for example, 100 wavelength division multiplexed signal lights) transmitted from the transmitting station are dropped.

On the other hand, the signal lights having passed through the optical fiber grating 122 without being reflected enter the optical fiber grating 124 through the optical isolator 123. Meanwhile, signal lights transmitted from the branch station through the branch line 127 enter the optical fiber grating 124 through the optical circulator 125 and are reflected by the optical fiber grating 124. Then, by the optical fiber grating 124, the signal lights (for example, approximately 20 signal lights) transmitted from the branch station through the branch line 127 are multiplexed with (added to) the signal lights transmitted from the transmitting station through the down line 120. The multiplexed signal lights pass the optical circulator 125 and are transmitted to the receiving station through the down line 120.

SUMMARY OF THE INVENTION

Incidentally, where those particular signal lights individually having particular wavelengths (for example, approximately 20 signal lights) from among the wavelength division multiplexed signal lights (for example, 100 wavelength division multiplexed signal lights) transmitted through the optical transmission line 110 are branched (dropped) and signal lights individually having corresponding wavelengths are multiplexed by the optical adding and dropping apparatus 104 as described above, a transmitter-receiver (or a repeater) to be provided in the branch station 105 must be configured in accordance with specifications different from those of a transmitter-receiver (or a repeater) to be provided in the transmitting station or the receiving station in order to make it possible to receive only the particular signal lights from among all signal lights and transmit only signal lights individually having wavelengths corresponding to the signal lights of the particular wavelength. In particular, since the number of the wavelengths of the signal lights to be branched and multiplexed is smaller than that of all signal lights, a transmitter-receiver (or a repeater) to be provided on the branch line must be configured in accordance with specifications (for example, a low output power specification) different from those of a transmitter-receiver (or a repeater) to be provided on the trunk line. In this instance, the transmitter-receiver (or repeater) to be provided on the branch line and the transmitter-receiver (or repeater) to be provided on the trunk line are designed separately from each other, and this is not preferable.

Further, a DWDM optical transmission system whose development is proceeding at present is designed as a system for wavelength division multiplexing for example, 60 to 150 signal lights of different waves. Therefore, if the number of wavelengths (for example, 20 wavelengths) of signal lights to be branched (dropped) is smaller than that (for example, 100 wavelengths) of all signal lights to be transmitted through the trunk line, then the power per one wavelength of the branched signal lights becomes excessively high, and this situation is not preferable.

Incidentally, Japanese Patent Laid-Open No. 10-150433 discloses a technique wherein, in order to compensate for a difference between the power level of signal lights from a transmitting station and the power level of signal lights from a branch station, dummy lights are wavelength division multiplexed with the signal lights from the branch station to vary the level of the dummy lights so that the levels of the signal lights to be inserted (added) can be adjusted (refer to, for example, the third embodiment).

However, a technique regarding adjustment of the power of branched (dropped) signal lights is not considered at all.

In this manner, although it is comparatively easy to insert dummy lights in order to adjust the power of signal lights to be inserted (added), it is difficult to insert dummy lights in order to adjust the power of branched (dropped) signal lights.

It is an object of the present invention to provide an optical transmission apparatus (optical adding and dropping apparatus) and an optical transmission system wherein a transmitter-receiver or a repeater can be used commonly, for example, for a trunk line and a branch line.

It is another object of the present invention to provide an optical transmission apparatus (optical adding and dropping apparatus) and an optical transmission system wherein the power of branched (dropped) signal lights can be adjusted and the situation can be prevented that the power per one wavelength of branched signal lights becomes excessively high.

In order to attain the objects described above, according to an aspect of the present invention, there is provided an optical transmission apparatus, comprising a return line for connecting a first transmission line and a second transmission line opposed to the first transmission line, a dummy light, which is inputted together with a signal light to be added to a signal light transmitted in the first transmission line, being transmitted to the second transmission line through the return line and being outputted together with a signal light to be dropped from the second transmission line.

Preferably, the optical transmission apparatus further comprises a first grating provided on the first transmission line for reflecting the signal light to be added to the signal light transmitted in the first transmission line and passing the dummy light therethrough, a second grating provided on the second transmission line for multiplexing the dummy light transmitted thereto through the return line with the signal light to be dropped from a signal light transmitted in the second transmission line, an optical decoupler for connecting the first transmission line and the return line so that the dummy light passing through the first grating is introduced to the return line, and an optical coupler for connecting the second transmission line and the return line so that the dummy light transmitted through the return line is introduced to the second grating.

Preferably, an optical amplifier is provided on the return line.

Preferably, a variable optical attenuator is provided on the return line.

According to another aspect of the present invention, there is provided an optical transmission apparatus, comprising a return line capable of outputting a dummy light, which is inputted thereto together with a signal light to be added to a signal light transmitted in a transmission line, together with a signal light to be dropped from the transmission line.

According to a further aspect of the present invention, there is provided an optical transmission system, comprising an optical transmission apparatus described above.

According to a still further aspect of the present invention, there is provided an optical transmission system, comprising a first line and a second line opposed to the first line, and a return line for introducing a dummy light inputted to the first line to the second line opposed to the first line.

Accordingly, with the present invention, there is an advantage that a transmitter-receiver or a repeater can be used commonly for the trunk line and the branch line. Further, there is another advantage that the power of branched (dropped) signal lights can be adjusted and a situation can be prevented that the power per one wavelength of branched signal lights becomes excessively high. Furthermore, there is a further advantage that the number of dummy light sources can be reduced to one half.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

In the following, an optical transmission apparatus (optical add/drop apparatus) and an optical transmission system according to an embodiment of the present invention are described with reference to the drawings.

In the present embodiment, an optical add/drop apparatus (a branching apparatus of an add/drop type; add drop branching unit, submarine branching apparatus) to be provided in a high-capacity long-distance submarine optical transmission system (optical submarine cable system) as a DWDM optical transmission system is described as an example.

Figure 2:
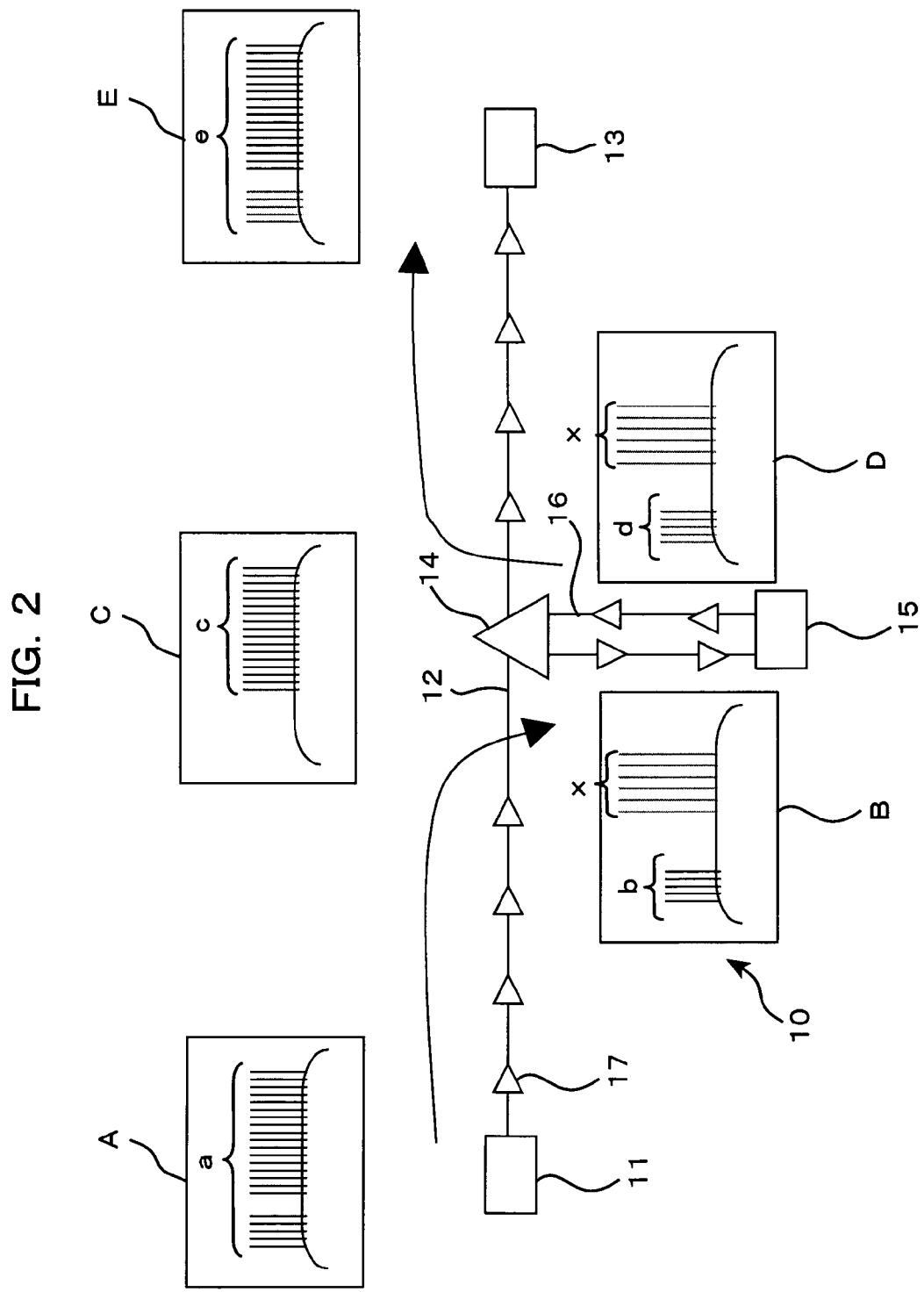
FIG. 2 is a schematic view showing an optical transmission system which includes the optical transmission apparatus (optical add/drop apparatus) according to the embodiment of the present invention.

Referring first to FIG. 2, a high-capacity long-distance submarine optical transmission system (optical submarine cable system) 10 as an optical transmission system includes a transmitting station (terminal) 11 for transmitting wavelength division multiplexed signal lights, and an optical transmission line (trunk line) 12 for connecting the transmitting station 11 and a receiving station 13. The receiving station (terminal) 13 receives the wavelength multiplexed signal lights transmitted thereto through the optical transmission line 12. The high-capacity long-distance submarine optical transmission system 10 further includes an optical add/drop apparatus (branching unit) 14 for branching signal lights having specific wavelengths from among the wavelength signal lights from the transmitting station 11 and multiplexing signal lights transmitted through an optical transmission line (branch line) 16 connected to a branch station 15. The branch station (terminal) 15 receives the signal lights of the specific wavelengths branched by the optical add/drop apparatus 14 and transmits signal lights to be multiplexed with the signal lights transmitted in the optical transmission line 13. It is to be noted that a plurality of optical amplifiers 17 are provided on the optical transmission lines 12 and 16.

It is to be noted that, while only a one-direction trunk line (up line or down line) is shown in FIG. 2 in order to facilitate understanding, actually, not only the one-direction trunk line but also a trunk line (down line or up line) for the opposite direction are provided so that bidirectional communication is implemented. Further, while the transmitting station 11, receiving station 13 and branch station 15 here are described as terminals, even if they are formed as repeater stations, they operate similarly. In this instance, the transmitting station 11 functions as a repeater station on the transmitting side and the receiving station 13 functions as a repeater station on the receiving side, and the branch station 15 functions as a repeater station on the branch side.

In the optical add/drop apparatus 14 used in the optical transmission system configured as described above, as shown in FIG. 1, an optical circulator 21, an optical fiber grating (grating) 22, an optical isolator 23, another optical fiber grating (grating) 24, and another optical circulator 25 are interposed in order in an up line (trunk line) 20. Further, an optical circulator 31, an optical fiber grating (grating) 32, an optical isolator 33, another optical fiber grating (grating) 34, and another optical circulator 35 are interposed in order in a down line (trunk line) 30 as an opposed line.

Further, a dropping branch line 26 is connected to the optical circulator 21, and an adding branch line 27 is connected to the optical circulator 25. Meanwhile, a dropping branch line 36 is connected to the optical circulator 31, and an adding branch line 37 is connected to the optical circulator 35.

Figure 1:
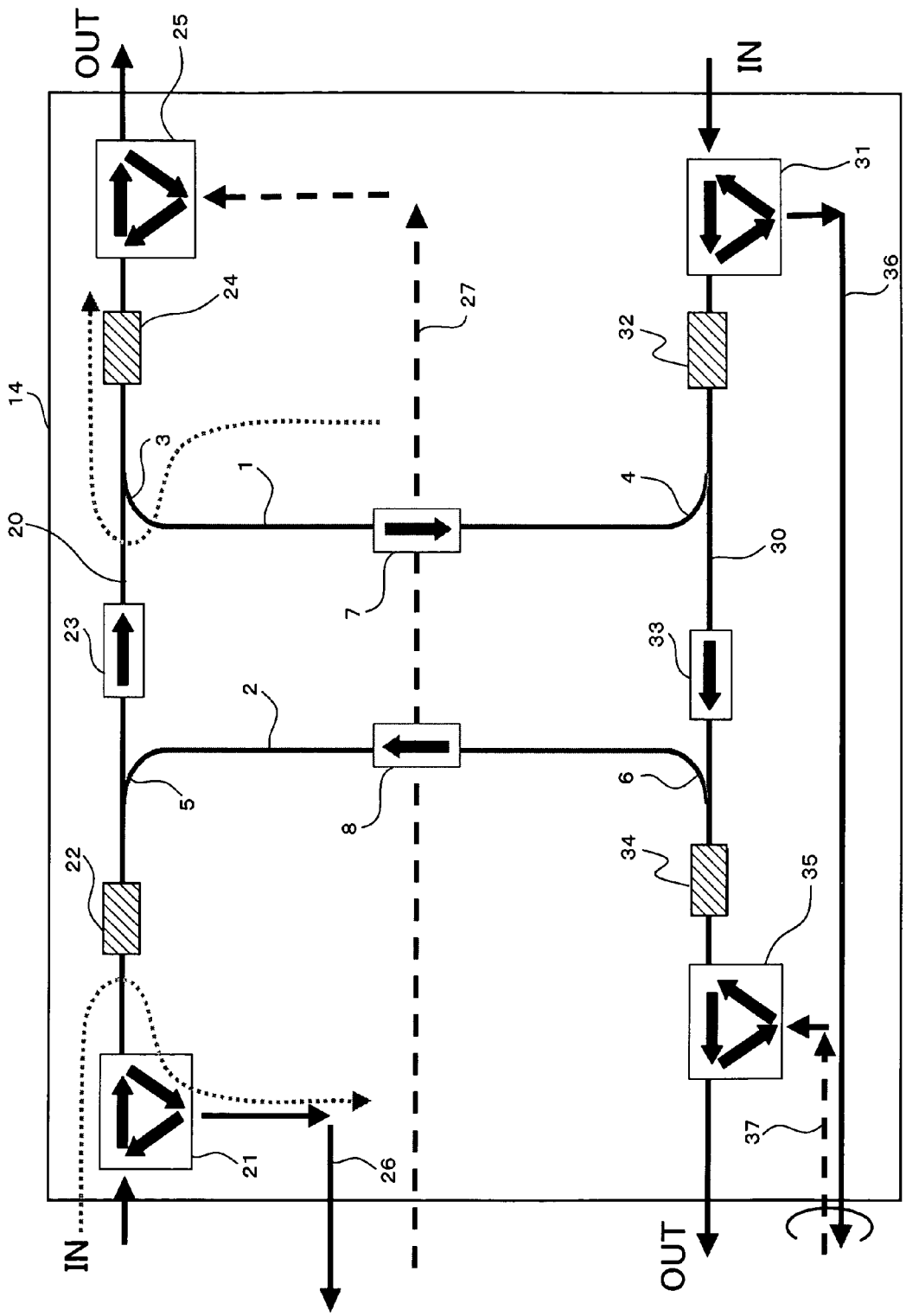
FIG. 1 is a schematic view showing an optical transmission apparatus (optical add/drop apparatus) according to an embodiment of the present invention.

Particularly, in the present embodiment, as shown in FIG. 1, two return lines (return circuits, returning optical transmission lines) 1 and 2 are provided so as to interconnect the up line 20 and the down line 30.

More particularly, one end of the first return line 1 is connected to the up line 20 between the optical isolator 23 and the optical fiber grating 24 on the succeeding stage side through an optical decoupler (optical divider, optical decoupler/coupler) 3. The other end of the first return line 1 is connected to the down line 30 between the optical isolator 33 and the optical fiber grating 32 on the preceding stage side through an optical coupler (optical decoupler/coupler) 4.

Here, the optical decoupler 3 is connected to the up line 20 so that a dummy light having passed through the optical fiber grating 24 is introduced to the first return line 1. Meanwhile, the optical coupler 4 is connected to the down line 30 so that a dummy light transmitted through the first return line 1 is introduced to the optical fiber grating 32.

On the other hand, one end of the second return line 2 is connected to the up line 20 between the optical isolator 23 and the optical fiber grating 22 on the succeeding stage side through an optical coupler (optical decoupler/coupler) 5. The other end of the second return line 2 is connected to the down line 30 between the optical isolator 33 and the optical fiber grating 34 on the preceding stage side through an optical decoupler (optical divider, optical decoupler/coupler) 6.

Here, the optical decoupler 6 is connected to the down line 30 so that a dummy light having passed through the optical fiber grating 34 is introduced to the second return line 2. Meanwhile, the optical coupler 5 is connected to the up line 20 so that a dummy light transmitted through the second return line 2 is introduced to the optical fiber grating 22.

Further, optical isolators 7 and 8 are interposed in the first and second return lines 1 and 2, respectively.

Figure 7:
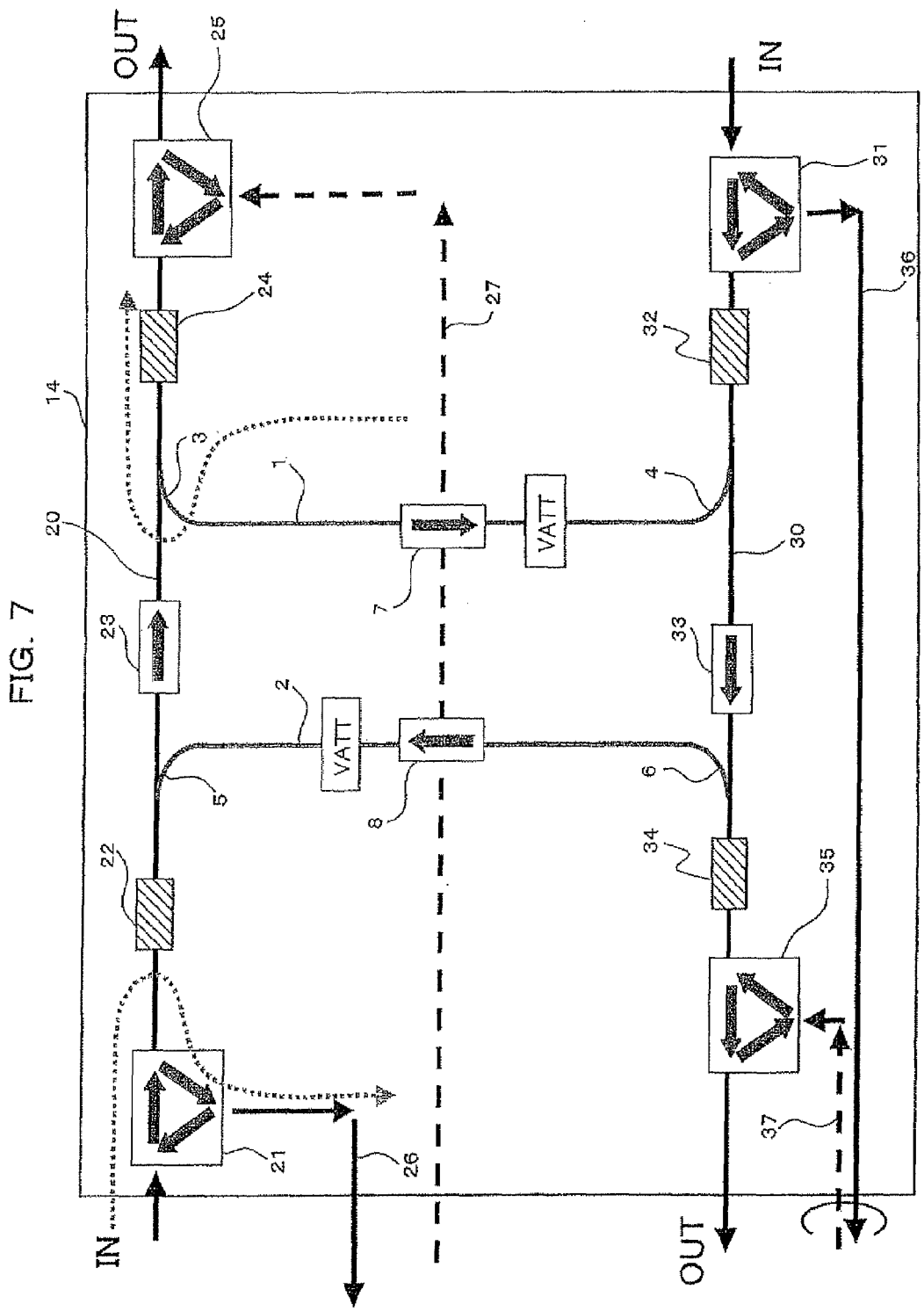
FIG. 7 is a schematic view showing the use of variable optical attenuators.

It is to be noted that variable optical attenuators (VATT) may be further provided on the first and second return lines 1 and 2 so as to adjust the powers of dummy lights as shown, for example, in FIG. 7. This is effective to prevent such a situation that, where the distance between the optical add/drop apparatus 14 and the nearest optical amplifier 17 provided on the branch line is excessively short depending upon the location of the optical add/drop apparatus 14, the powers of signal lights and dummy lights to be transmitted to the optical add/drop apparatus 14 become excessively high. On the other hand, where the distance between the optical add/drop apparatus 14 and the nearest optical amplifier 17 provided on the branch line is excessively long depending upon the location of the optical add/drop apparatus 14, an optical amplifier may be provided so as to adjust the powers of the dummy lights. By the countermeasure, such a situation that the powers of the signal lights and dummy lights to be transmitted to the optical add/drop apparatus 14 become excessively low can be prevented. Further, provision of such a variable optical attenuator or an optical amplifier as described above in this manner makes it possible to be ready also for a case wherein there is a difference between the power of signal lights to be added (inserted) and the power of signal lights to be dropped (branched).

Since the optical add/drop apparatus 14 has such a configuration as described above, wavelength division multiplexed signal lights transmitted from the transmitting terminal through the up line 20 pass the optical circulator 21 and enter the optical fiber grating 22. In the optical fiber grating 22, only those signal lights individually having specific wavelengths (for example, approximately 20 signal lights) from among the wavelength division multiplexed signal lights (for example, 100 wavelength division multiplexed signal lights) transmitted from the transmitting station are reflected.

On the other hand, in the present embodiment, wavelength division multiplexed lights produced by wavelength division multiplexing signal lights and dummy lights to be multiplexed with (added to) signal lights transmitted through the down line 30 are transmitted from the branch station through the branch line 37, and then they pass the optical circulator 35 and enter the optical fiber grating 34. In the optical fiber grating 34, only the signal lights from among the wavelength division multiplexed lights transmitted from the branch station are reflected while the dummy lights pass. Consequently, the wavelength division multiplexed lights are demultiplexed into the signal lights and the dummy lights. The dummy lights having passed through the optical fiber grating 34 enter the optical fiber grating 22 through the optical decoupler 6, second return line 2 and optical coupler 5.

Then, in the optical fiber grating 22, the dummy lights transmitted from the branch station are multiplexed with the specific wavelength signal lights transmitted from the transmitting station. The specific wavelength signal lights and dummy lights multiplexed in this manner are sent to the branch line 26 through the optical circulator 21 and then transmitted to the branch station through the branch line 26.

Consequently, the dummy lights having entered the down line 30 together with the signal lights to be multiplexed with (added to) the signal lights transmitted through the down line 30 are sent to the up line 20 through the second return line 2 and are dropped together with the signal lights individually having the specific wavelengths (for example, approximately 20 signal lights) from among the wavelength division multiplexed signal lights (for example, 100 wavelength division multiplexed signal lights) transmitted through the up line 20 which is an opposed line. In other words, the dummy lights having entered the down line 30 from the branch station through the branch line 37 are returned from the up line 20 which is an opposed line to the branch station through the branch line 26.

On the other hand, the signal lights having passed through the optical fiber grating 22 without being reflected enter the optical fiber grating 24 through the optical isolator 23. Meanwhile, the signal lights transmitted from the branch station through the branch line 27 enter the optical fiber grating 24 through the optical circulator 25 and are reflected by the optical fiber grating 24. Then, in the optical fiber grating 24, the signal lights transmitted from the branch station through the branch line 27 are multiplexed with (added to) the signal lights transmitted from the transmitting station through the up line 20. The multiplexed signal lights pass the optical circulator 25 and are transmitted to the receiving station through the up line 20.

Similarly, wavelength division multiplexed signal lights transmitted from the transmitting station through the down line 30 pass the optical circulator 31 and enter the optical fiber grating 32. By the optical fiber grating 32, only those signal lights individually having specific wavelengths (for example, approximately 20 signal lights) from among the wavelength division multiplexed signal lights (for example, 100 wavelength division multiplexed signal lights) transmitted from the transmitting station are reflected.

On the other hand, in the present embodiment, wavelength division multiplexed lights produced by wavelength division multiplexing signal lights and dummy lights to be multiplexed with (added to) signal lights transmitted through the up line 20 are transmitted from the branch station through the branch line 27, and then they pass the optical circulator 25 and enter the optical fiber grating 24. In the optical fiber grating 24, only the signal lights from among the wavelength division multiplexed lights transmitted from the branch station are reflected while the dummy lights pass. Consequently, the wavelength division multiplexed lights are demultiplexed into the signal lights and the dummy lights. The dummy lights having passed through the optical fiber grating 24 enter the optical fiber grating 32 through the optical decoupler 3, first return line 1 and optical coupler 4.

Then, in the optical fiber grating 32, the dummy lights transmitted from the branch station are multiplexed with the specific wavelength signal lights transmitted from the transmitting station. The specific wavelength signal lights and dummy lights multiplexed in this manner are sent to the branch line 36 through the optical circulator 31 and then transmitted to the branch station through the branch line 36.

Consequently, the dummy lights having entered the up line 20 together with the signal lights to be multiplexed with (added to) the signal lights transmitted through the up line 20 are sent to the down line 30 through the first return line 1 and are dropped together with the signal lights individually having the specific wavelengths (for example, approximately 20 signal lights) from among the wavelength division multiplexed signal lights (for example, 100 wavelength division multiplexed signal lights) transmitted through the down line 30 which is an opposed line. In other words, the dummy lights having entered the up line 20 from the branch station through the branch line 27 are returned from the down line 30 which is an opposed line to the branch station through the branch line 26.

On the other hand, the signal lights having passed through the optical fiber grating 32 without being reflected enter the optical fiber grating 34 through the optical isolator 33. Meanwhile, the signal lights transmitted from the branch station through the branch line 37 enter the optical fiber grating 34 through the optical circulator 35 and are reflected by the optical fiber grating 34. Then, in the optical fiber grating 34, the signal lights (for example, approximately 20 signal lights) transmitted from the branch station through the branch line 37 are multiplexed with (added to) the signal lights transmitted from the transmitting station through the down line 30. The multiplexed signal lights pass through the optical circulator 35 and are transmitted to the receiving station through the down line 30.

Consequently, in the optical transmission system according to the present embodiment, as shown in FIG. 2, some signal lights b from among all signal lights a (refer to reference character A) transmitted from the transmitting station 11 are branched (dropped) by the optical add/drop apparatus 14 and transmitted to the branch station 15 through the optical transmission line 16 together with dummy lights x (refer to reference character D) transmitted from the branch station 15 through the optical transmission line 16 together with signal lights d (refer to reference character B). On the other hand, the remaining signal lights c (refer to reference character C) are multiplexed with (added to) signal lights d (refer to reference character D) transmitted from the branch station 15 by the optical add/drop apparatus 14, and the multiplexed signal lights e (refer to reference character E) are transmitted to the receiving station 13 through the optical transmission line 12.

Accordingly, according to the present invention, since dummy lights having entered together with signal lights to be multiplexed with signal lights transmitted in an up line (or a down line) through a branch line are looped back by the optical add/drop apparatus (adding and dropping type branching apparatus) 14 and are returned to a branch station (a transmitter-receiver or a repeater provided on the branch line) through the branch line together with signal lights branched (dropped) from among signal lights transmitted through the down line (or up line) which is an opposed line, there is an advantage that the transmitter-receiver or repeater to be provided on the branch line can be configured in accordance with specifications similar to those of a transmitter-receiver or a repeater to be provided on a trunk line, and a transmitter-receiver or a repeater can be used commonly for the trunk line and the branch line.

Further, since the dummy lights can be inserted into the branched (dropped) signal lights, if the power of the dummy lights is adjusted, then the power of the branched signal lights can be adjusted. Consequently, there is an advantage that such a situation can be prevented that the power per one wavelength of the branched signal lights becomes excessively high. In particular, the power per one wavelength of the branched signal lights can be controlled so as to suppress the power to a fixed level. Particularly, also in a stage (for example, an initial stage) wherein the number of signal lights to be branched is small, the power of the signal lights can be adjusted by inserting dummy lights into branched signal light.

It is to be noted that, while in the embodiment described above, a return line for connecting one trunk line (first transmission line) and another trunk line (second transmission line) opposed to the trunk line is provided so that dummy lights inputted together with signal lights to be added to signal lights transmitted through the one trunk line (first transmission line) are outputted together with signal lights to be dropped from the other trunk line (second transmission line), the present invention is not limited to this. At least, a return line may be provided which can output dummy lights inputted together with signal lights to be added to signal lights transmitted from a transmission line together with signal lights to be dropped from the transmission line.

For example, the optical transmission apparatus may be configured such that one end of a return line is connected to the up line (transmission line) 20 between the optical isolator 23 and the optical fiber grating 24 on the succeeding stage side through an optical decoupler and the other end of the return line is connected to the up line 20 between the optical fiber grating 22 on the preceding stage side and the optical isolator 23 through an optical coupler. And, the optical transmission apparatus may be configured otherwise such that one end of a return line is connected to the down line (transmission line) 30 between the optical fiber grating 34 on the succeeding stage side and the optical isolator 33 through an optical decoupler and the other end of the return line is connected to the down line 30 between the optical fiber grating 32 on the preceding stage side and the optical isolator 33 through an optical coupler. Or else, a return line for connecting one branch line (a first transmission line) and another branch line (a second transmission line) opposed to the branch line may be provided so that dummy lights inputted together with signal lights to be added to signal lights transmitted through the one branch line (the first transmission line) are outputted together with signal lights to be dropped from the other branch line (the second transmission line). Further, the return line may be connected to a transmission line different from the opposed transmission line.

Incidentally, where the levels of signal lights are adjusted utilizing dummy lights, the dummy lights are usually terminated after the adjustment.

For example, while, also in the third embodiment disclosed in Japanese Patent Laid-Open No. 10-150433, the levels of signal lights are adjusted utilizing dummy lights, the dummy lights transmitted in a wavelength division multiplexed state with signal lights to be inserted (added) are almost dissipated without being reflected by a fiber grating and without passing an isolator (for example, refer to the paragraph number 0046 of the specification of Japanese Patent Laid-Open No. 10-150433).

In contrast, the present invention employs a technical idea that dummy lights inputted to one line (up line or down line) are returned to the other line (down line or up line) by a return line so as to effectively utilize them, and the embodiment described hereinabove is one embodiment wherein the technical idea is implemented. Possible embodiments included in this technical idea are not limited to the embodiment described hereinabove. A different embodiment is described below.

In recent years, for a WDM type optical transmission system, system design of a maximum capacity is performed, and on the other hand, an upgrade method is commonly utilized wherein, for example, one to ten wavelengths are used in an initial stage in order to reduce an initial cost, and thereafter, the number of wavelengths is gradually increased as occasion demands.

However, since the system is designed so as to have a maximum capacity and the optical output power of an optical amplifier is constant, in a state wherein the channel number (wavelength number) in an initial stage is small, there is the possibility that the optical output power of signal lights of the channels may become excessively high, and the transmission of signals may be disabled by a nonlinearity of an optical fiber or the like.

Therefore, dummy lights are inputted in addition to signal lights to suppress the optical output power of signal lights of the channels.

Figure 3:
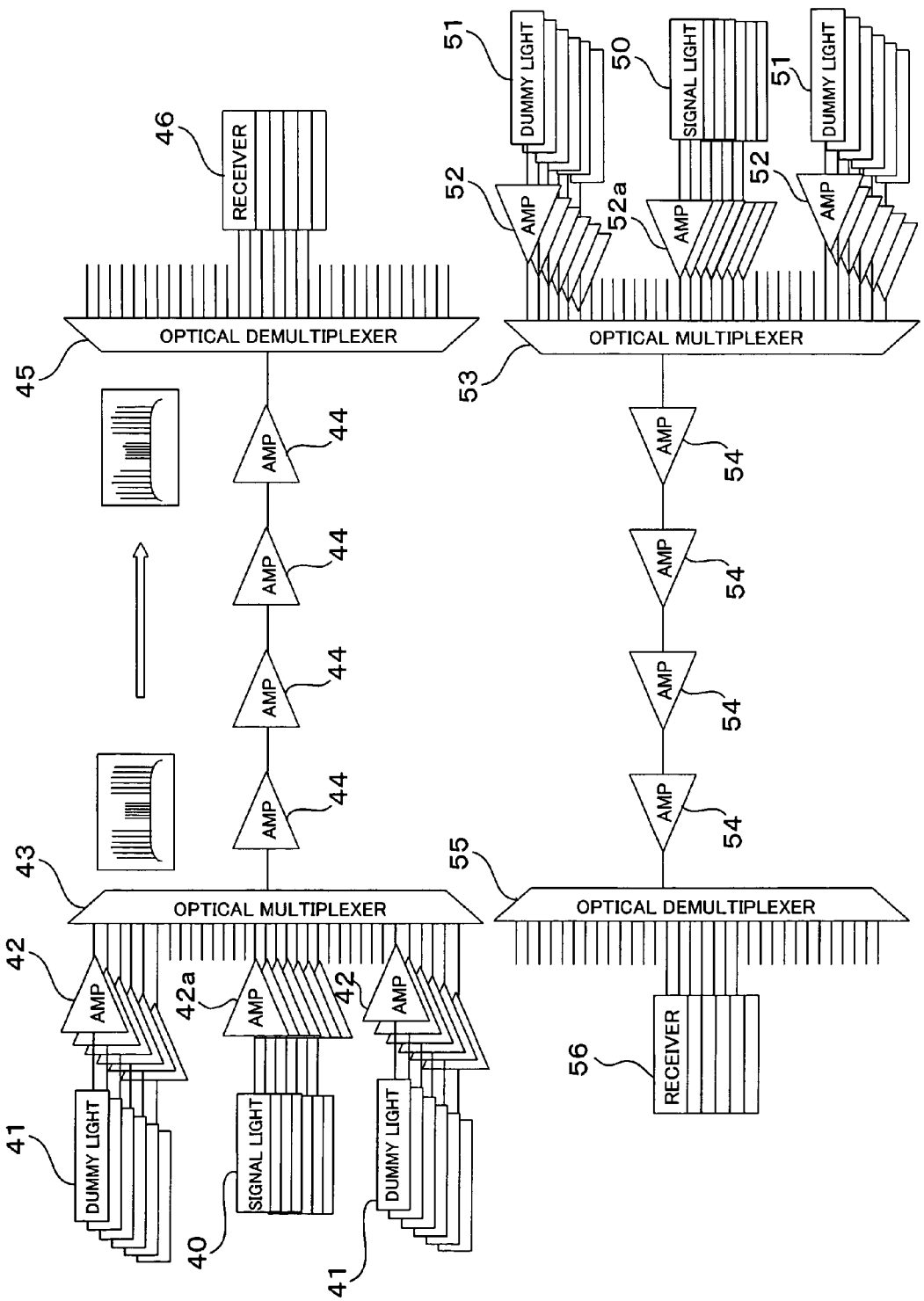
FIG. 3 is a schematic view showing a common optical transmission system.

In this instance, it is necessary to provide, for example, as shown in FIG. 3, not only optical transmitters 40 and 50 for transmitting, for example, approximately 1 to 10 signal lights but also dummy light sources 41 and 51 for transmitting, for example, approximately 10 to 30 dummy lights on transmitting stations on an up line (upper stage in FIG. 3) and a down line (lower stage in FIG. 3), respectively. Therefore, the initial cost increases as much. Further, the dummy light sources 41 and 51 become unnecessary as the wavelength number (channel number) increases. It is to be noted that, in FIG. 3, reference characters 42, 42a, 52, 52a, 44 and 54 denote each an optical amplifier, and 43 and 53 denote each an optical multiplexer. Further, reference characters 45 and 55 denote each an optical demultiplexer, and 46 and 56 denote each a receiver.

Therefore, in another present embodiment of the present invention, the optical transmission system is configured as described below.

Figure 4:
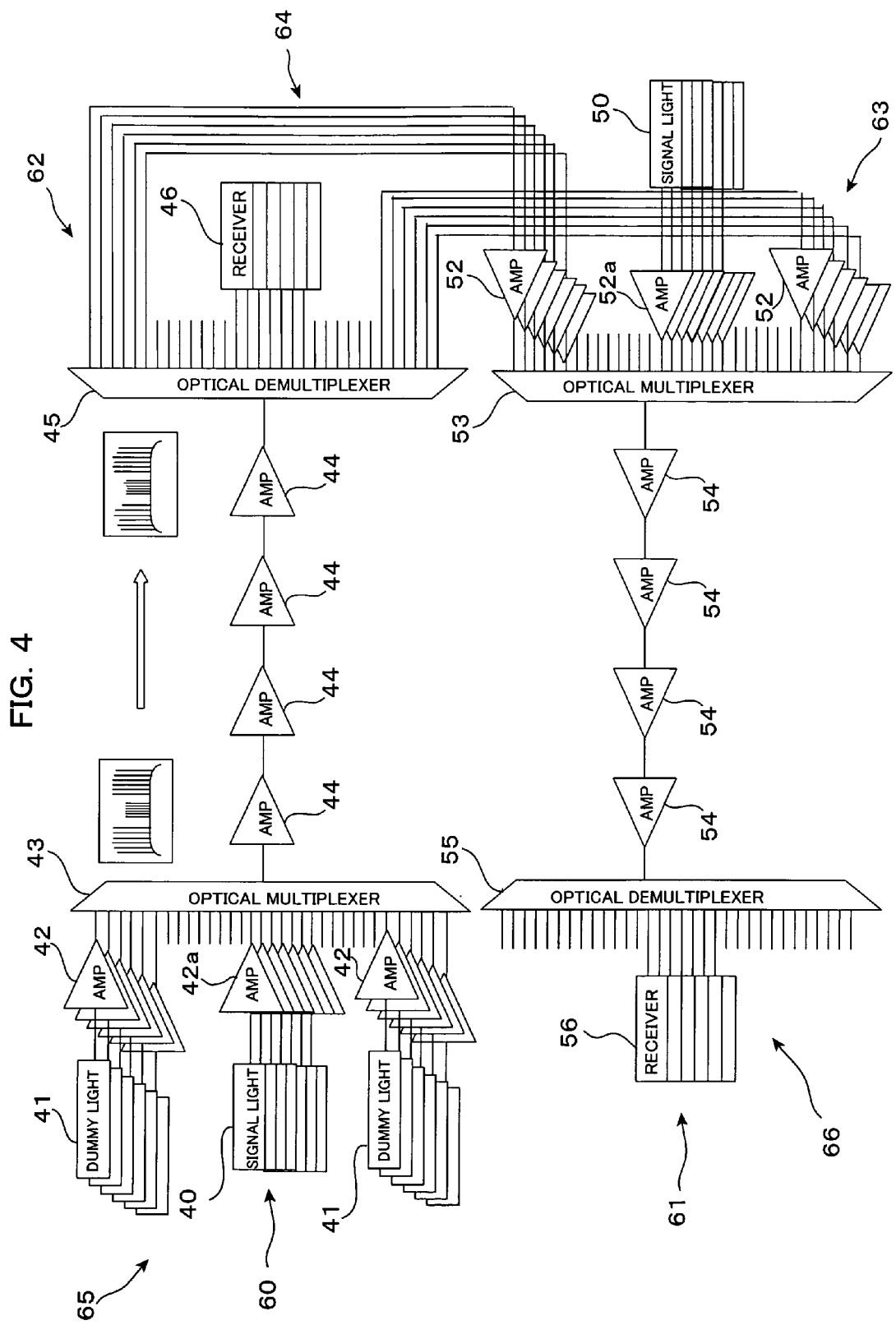
FIG. 4 is a schematic view showing an optical transmission system according to another embodiment of the present invention.
Figure 5:
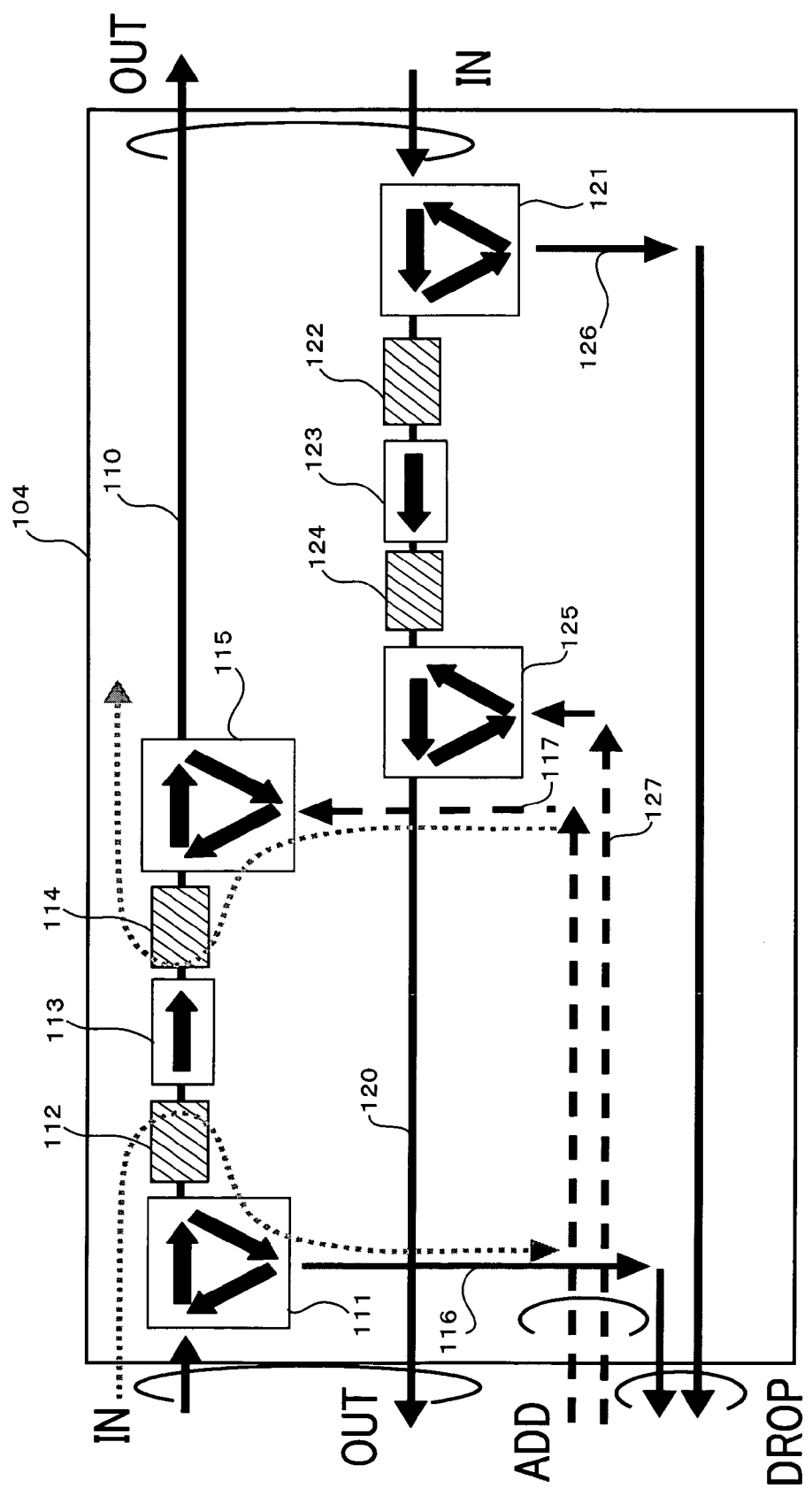
FIG. 5 is a schematic view showing a common optical add/drop apparatus.
Figure 6:
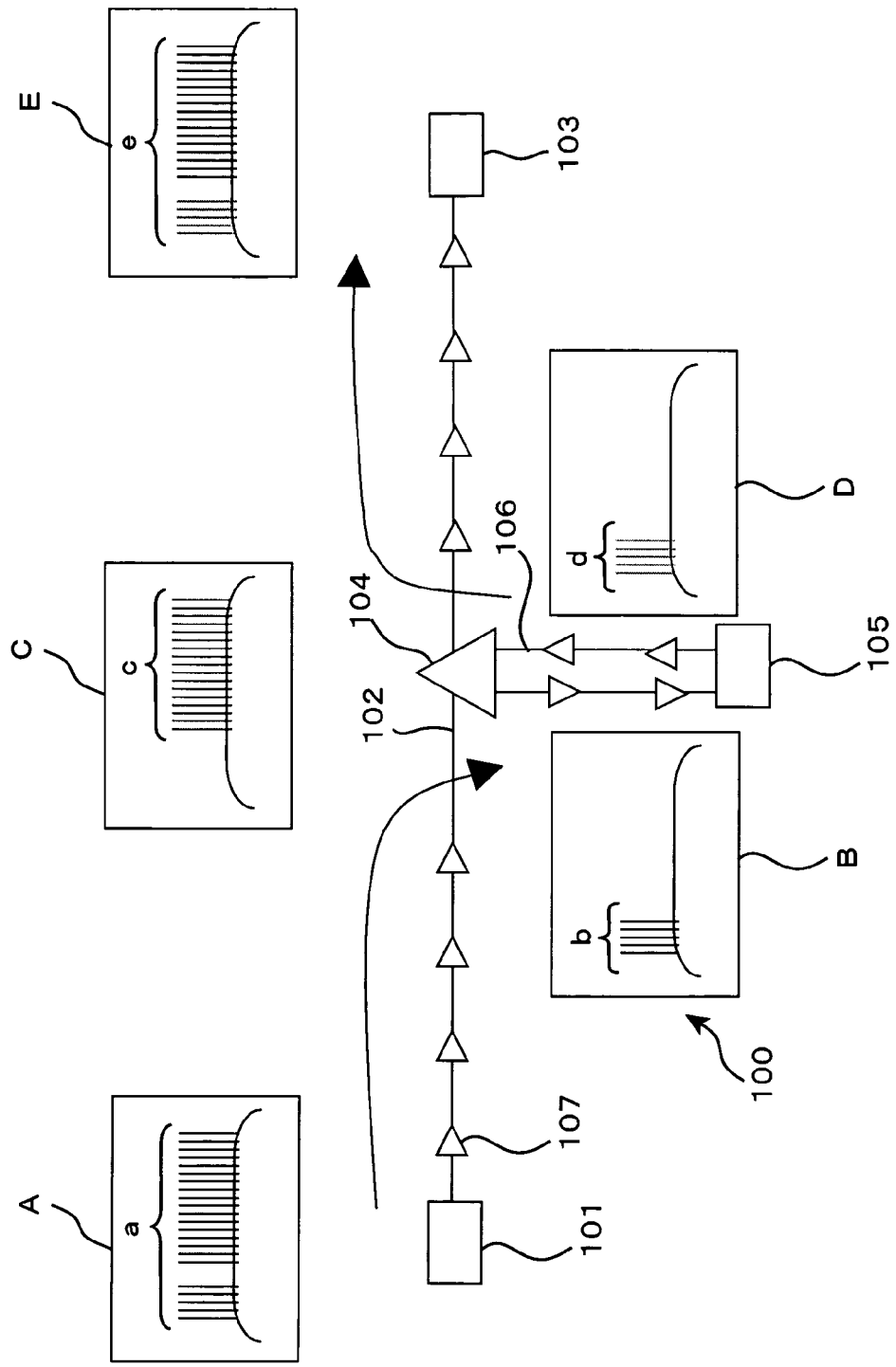
FIG. 6 is a schematic view showing an optical transmission system which includes the common optical add/drop apparatus.

In particular, as shown in FIG. 4, the present optical transmission system includes an up line (upper stage in FIG. 4) 60 and a down line (lower stage in FIG. 4) 61 opposed to the up line 60, and further includes return lines 64 for introducing dummy lights inputted to the up line 60 to the down line 61 opposed to the up line 60. It is to be noted that, while, in the present embodiment, the optical transmission system is configured such that dummy lights are introduced to the opposed line, the dummy lights may be introduced otherwise to a line different than the opposed line. It is to be noted that, in FIG. 4, like elements to those of FIG. 3 are denoted by like reference characters.

Figure 8:
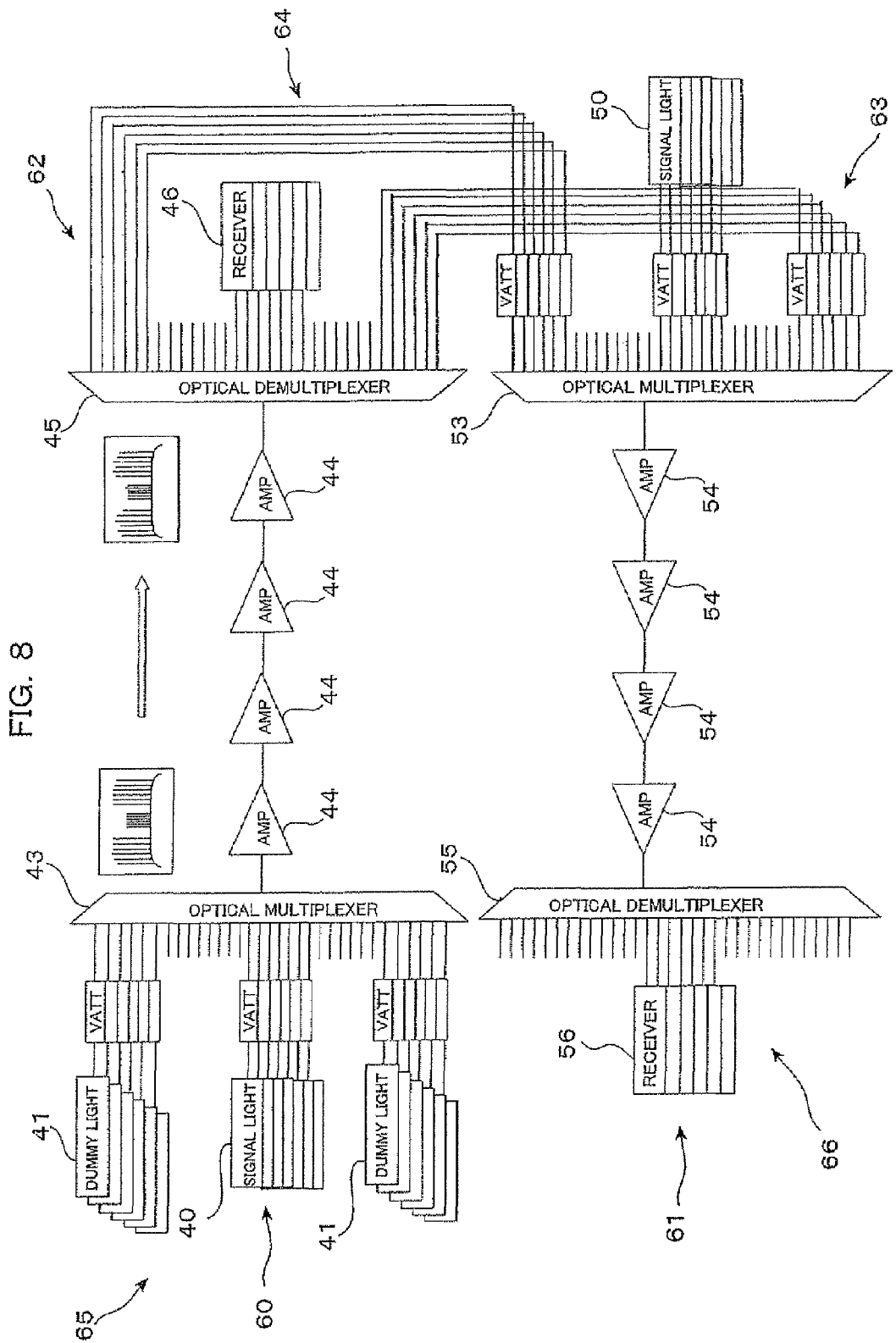
FIG. 8 is a schematic view showing the use of variable optical attenuators.

Here, since the optical amplifiers 44 and 54 provided halfway of the transmission line are configured so that the optical output powers are controlled so as to become constant, by the optical amplifiers (optical post amplifiers) 42 and 52 provided on a transmitting station 65 on the up line 60, the optical output power of the dummy lights is adjusted so that the optical output power per one signal light has a constant value same as that where a transmission process is performed on the transmission line with the maximum capacity. Further, adjustment of the optical output power of the signal lights is performed by optical amplifiers 42a and 52a. It is to be noted that not the optical amplifiers 42, 42a, 52 and 52a but variable optical attenuators (VATT) may be provided in order to adjust the optical output power, as shown, for example, in FIG. 8.

Further, in the present embodiment, the optical amplifiers 52 are provided on a transmitting station 63 on the down line 61, and the optical output power of dummy lights transmitted to the transmitting station 63 on the down line 61 which is an opposed line through the return lines 64 is adjusted. It is to be noted that an optical amplifier may be provided on a receiving station 62 on the up line 60 in substitution for the provision of the optical amplifiers 52 on the transmitting station 63 on the down line 61. Further, not optical amplifiers but variable optical attenuators (VATT) may be provided in order to adjust the optical output power of dummy lights.

It is to be noted that, since a signal band in the transmission line is designed so as not to generate a deviation between optical output powers of signal lights, the signal lights are transmitted to the receiving stations 62 and 66 with a deviation same as that on the transmission side. Then, the received signal lights are demultiplexed into individual wavelengths by optical demultiplexers 45 and 55 and are reproduced by receivers 46 and 56 as they are (or after amplified again).

Since the present optical transmission system is configured as described above, in the transmitting station 65 on the up line 60, dummy lights outputted from the dummy light source 41 and having stabilized wavelengths are multiplexed with signal lights outputted from the transmitter 40 by the optical multiplexer 43. Then, the wavelength division multiplexed lights are signaled to the optical transmission line of the up line 60, and the optical output power per one wave of the signal lights transmitted through the optical transmission line of the up line 60 and the deviations between the optical output powers are controlled fixedly with the dummy lights. The dummy lights transmitted through the optical transmission line of the up line 60 are demultiplexed by the optical demultiplexer 45 provided on the receiving station 62 and are introduced to the transmitting station 63 on the down line 61 which is an opposed line through the return line 64. The optical output power of the dummy lights transmitted to the transmitting station 63 on the down line 61 is adjusted by the optical amplifier 52, and thereafter, the dummy lights are multiplexed with signal lights outputted from the transmitter 50 by the optical multiplexer 53. Then, the wavelength division multiplexed lights are signaled to the optical transmission line of the down line 61, and the optical output power per one wave of the signal lights transmitted through the optical transmission line of the down line 61 and the deviations between the optical output powers are controlled fixedly with the dummy lights.

In this manner, in the present embodiment, since dummy lights demultiplexed and terminated normally by a receiving station are returned to an opposed line and are utilized as dummy lights again, there is an advantage that the number of dummy light sources can be reduced to one half.

The present invention is not limited to the embodiment specifically described above, and variations and modifications can be made without departing from the scope of the present invention.

What is claimed is:

1. An optical transmission apparatus, comprising:
   a return line for connecting a first transmission line and a second transmission line opposed to said first transmission line; and
   a dummy light input/output device operable to input a dummy light, together with a signal light to be added to said first transmission line, to said second transmission line through said return line and to output the dummy light together with a signal light to be dropped from said second transmission line, wherein
   a power of the signal light is adjusted by the dummy light.

2. The optical transmission apparatus as claimed in claim 1, further comprising:

a first grating provided on said first transmission line for reflecting the signal light to be added to said first transmission line and passing the dummy light therethrough;

a second grating provided on said second transmission line for multiplexing the dummy light transmitted thereto through said return line with the signal light to be dropped from said second transmission line;

an optical decoupler for connecting said first transmission line and said return line so that the dummy light passing through said first grating is introduced to said return line; and an optical coupler for connecting said second transmission line and said return line so that the dummy light transmitted through said return line is introduced to said second grating.

3. The optical transmission apparatus as claimed in claim 1, wherein an optical amplifier is provided on said return line.

4. The optical transmission apparatus as claimed in claim 1, wherein a variable optical attenuator is provided on said return line.

5. An optical transmission apparatus, comprising:

a return line capable of transmitting a dummy light which is inputted to a transmission line together with a signal light to be added in a transmission line, from a first location on the transmission line to a second location on the transmission line, such that the dummy light is output from the transmission line together with a signal light to be dropped from the transmission line, wherein a power of the signal light is adjusted by the dummy light.

6. An optical transmission system, comprising:

an optical transmission apparatus as claimed in claim 1.

7. An optical transmission system, comprising:

a first line and a second line opposed to said first line; and a return line for introducing a dummy light inputted to said first line to said second line opposed to said first line, wherein a power of a signal light is adjusted by the dummy light.

* * * * *